United States Patent
Yu et al.

(10) Patent No.: US 9,973,981 B2
(45) Date of Patent: May 15, 2018

(54) CONFIGURATION OF HANDOVERS IN COMMUNICATION SYSTEMS

(71) Applicant: Nokia Solutions and Networks Oy, Espoo (FI)

(72) Inventors: Ling Yu, Espoo (FI); Vinh Van Phan, Oulu (FI); Kari Veikko Horneman, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days. days.

(21) Appl. No.: 15/230,559

(22) Filed: Aug. 8, 2016

(65) Prior Publication Data

US 2016/0345214 A1  Nov. 24, 2016

Related U.S. Application Data

(63) Continuation of application No. 14/437,929, filed as application No. PCT/EP2012/071243 on Oct. 26, 2012, now Pat. No. 9,426,701.

(51) Int. Cl.

| | |
|---|---|
| *H04W 36/00* | (2009.01) |
| *H04W 36/16* | (2009.01) |
| *H04W 36/20* | (2009.01) |
| *H04W 36/22* | (2009.01) |
| *H04W 76/02* | (2009.01) |
| *H04W 76/04* | (2009.01) |
| *H04W 8/18* | (2009.01) |
| *H04W 24/10* | (2009.01) |
| *H04W 56/00* | (2009.01) |

(52) U.S. Cl.
CPC ....... *H04W 36/0055* (2013.01); *H04W 8/186* (2013.01); *H04W 24/10* (2013.01); *H04W 36/165* (2013.01); *H04W 36/20* (2013.01); *H04W 36/22* (2013.01); *H04W 56/00* (2013.01); *H04W 76/023* (2013.01); *H04W 76/043* (2013.01)

(58) Field of Classification Search
CPC ..... H04W 36/20; H04W 36/22; H04W 56/00; H04W 24/10
USPC .................. 455/436, 437, 439; 370/329, 331
See application file for complete search history.

(56) References Cited

U.S. PATENT DOCUMENTS

| | | |
|---|---|---|
| 6,490,452 B1 | 12/2002 | Boscovic et al. |
| 2011/0228666 A1 | 9/2011 | Barbieri et al. |

FOREIGN PATENT DOCUMENTS

| | | |
|---|---|---|
| EP | 2187672 A1 | 5/2010 |
| WO | WO 2011/109027 A1 | 9/2011 |
| WO | WO2014/000818 | 1/2014 |
| WO | WO2014/040617 | 3/2014 |
| WO | WO2014/053183 | 4/2014 |

OTHER PUBLICATIONS

Study of the ASA concept CGCRS(11)14, 14 (meeting proposal), CEPT ECC CG CRS(11) meeting, Sep. 26, 2011.

*Primary Examiner* — Sam Bhattacharya
(74) *Attorney, Agent, or Firm* — Harrington & Smith

(57) ABSTRACT

Apparatus and method for communication are provided. The solution includes obtaining information of handovers to be performed regarding more than one user equipment connected to the apparatus; requesting the user equipment to form one or more device-to-device clusters; and controlling handovers to be performed utilizing information on the formed device-to-device clusters.

17 Claims, 4 Drawing Sheets

US 9,973,981 B2

CONFIGURATION OF HANDOVERS IN COMMUNICATION SYSTEMS

CROSS-REFERENCE TO RELATED APPLICATIONS

This application is a continuation application of U.S. application Ser. No. 14/437,929, filed on Apr. 23, 2015, which is the National Stage of International Application No. PCT/EP2012/071243, filed on Oct. 26, 2012, the disclosures of which are hereby incorporated by reference in their entireties.

FIELD

The exemplary and non-limiting embodiments of the invention relate generally to wireless communication systems. Embodiments of the invention relate especially to apparatuses, methods, and computer program products in communication networks.

BACKGROUND

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

In the long term evolution advanced (LTE-Advanced) communication system, which is currently being developed, the concept of authorized shared access (ASA) has been under consideration. The ASA allows new user equipment (UE) to access, already licensed spectrum with the obligation to protect the incumbent (primary) user. The access may be carried out by using cognitive radio capabilities, such as geolocation databases complemented, if required, by sensing.

There may be situations when some or all UEs of an ASA cell need to handover (HO) to the neighbour cells. This results to a large number of handover which must be realized almost simultaneously. The realization of the handovers may be problematic from the network point of view.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus, comprising: at least one processor; and at least one memory including computer program code, the at least one memory and the computer program code configured to, with the at least one processor, cause the apparatus at least to: obtain information of handovers to be performed regarding more than one user equipment connected to the apparatus; request the user equipment to form one or more device-to-device clusters; control handovers to be performed utilising information on the formed device-to-device clusters.

According to an aspect of the present invention, there is provided an apparatus, comprising: at least one processor; and at least one memory including computer program code, the at least one memory and the computer program code configured to, with the at least one processor, cause the apparatus at least to: be in device-to-device communication with a set of user equipment forming a device-to-device cluster to be handed over to a target cell of a communication system; be handed over to the target cell while other user equipment of the cluster are still under the handover process; receive from user equipment of the cluster downlink synchronization information; transmit the information to the base station of the target cell.

According to an aspect of the present invention, there is provided an apparatus, comprising: at least one processor; and at least one memory including computer program code, the at least one memory and the computer program code configured to, with the at least one processor, cause the apparatus at least to: be in device-to-device communication with a set of user equipment forming a device-to-device cluster to be handed over to a target cell of a communication system; be handed over to the target cell; transmit to user equipment acting as cluster head downlink synchronization information; and leave the cluster autonomously after a predefined timer has expired.

According to an aspect of the present invention, there is provided a method obtaining information of handovers to be performed regarding more than one user equipment connected to the apparatus; requesting the user equipment to form one or more device-to-device clusters; controlling handovers to be performed utilising information on the formed device-to-device clusters.

According to another aspect of the present invention, there is provided a method being in device-to-device communication with a set of user equipment forming a device-to-device cluster to be handed over to a target cell of a communication system; being handed over to the target cell while other user equipment of the cluster are still under the handover process; receiving from user equipment of the cluster downlink synchronization information; transmitting the information to the base station of the target cell.

According to yet another aspect of the present invention, there is provided a method being in device-to-device communication with a set of user equipment forming a device-to-device cluster to be handed over to a target cell of a communication system; being handed over to the target cell; transmitting to user equipment acting as cluster head downlink synchronization information; and leaving the cluster autonomously after a predefined timer has expired.

LIST OF DRAWINGS

Embodiments of the present invention are described below, by way of example only, with reference to the accompanying drawings, in which FIG. 1 illustrates an example of a communication environment;

DESCRIPTION OF SOME EMBODIMENTS

Figure 1:
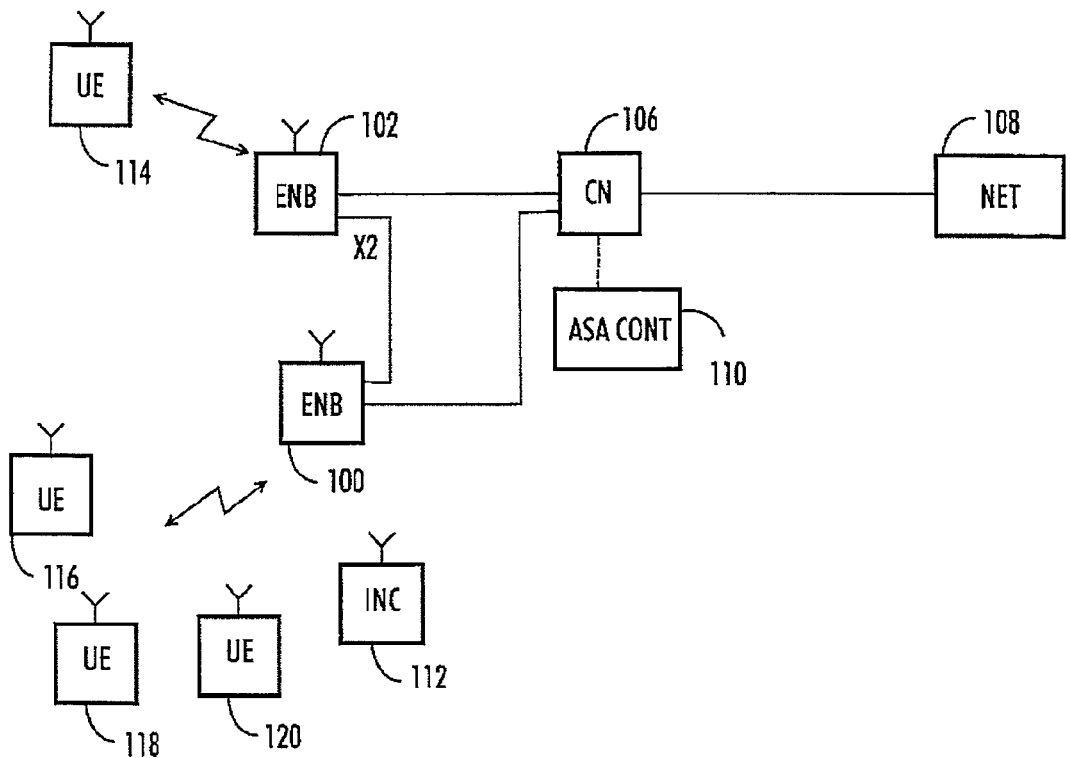

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain also features, structures, units, modules etc. that have not been specifically mentioned.

Embodiments are applicable to any base station, user equipment (UE), server, corresponding component, and/or to any communication system or any combination of different communication systems that support required functionalities.

The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, embodiments.

Many different radio protocols to be used in communications systems exist. Some examples of different communication systems are the universal mobile telecommunications system (UMTS) radio access network (UTRAN or E-UTRAN), long term evolution (LTE®, known also as E-UTRA), long term evolution advanced (LTE-A®), Wireless Local Area Network (WLAN) based on IEEE 802.11 standard, worldwide interoperability for microwave access (WiMAX), Bluetooth®, personal communications services (PCS) and systems using ultra-wideband (UWB) technology. IEEE refers to the Institute of Electrical and Electronics Engineers. LTE and LTE-A are developed by the Third Generation Partnership Project 3GPP.

In the following, different exemplifying embodiments will be described using, as an example of an access architecture to which the embodiments may be applied, a radio access architecture based on long term evolution advanced (LTE Advanced, LTE-A), that is based on orthogonal frequency multiplexed access (OFDMA) in a downlink and a single-carrier frequency-division multiple access (SC-FDMA) in an uplink, without restricting the embodiments to such an architecture, however. It is obvious for a person skilled in the art that the embodiments may also be applied to other kinds of communications networks having suitable means by adjusting parameters and procedures appropriately.

In the LTE-Advanced, the concept of authorized shared access (ASA) has been under consideration. The ASA allows new users to access already licensed spectrum with the obligation to protect the incumbent (primary) user. For example, the ASA allows international mobile telecommunications (IMT) service to access the bands that are under-utilised by existing primary uses, especially to bands that have been allocated to mobile but not made available for mobile use through current regulatory means. The access may be carried out by using cognitive radio capabilities, such as geolocation databases complemented, if required, by sensing. In general, the ASA is neither similar to exclusive licensing nor license-exempt but has few commonalities with licensing-light. According to the ASA concept, a secondary usage is possible, but the operator needs to evacuate its ASA spectrum for providing service to primary ASA users, if required. In principle, for the cell evacuation or clearance, fast and robust handovers to neighbouring cells are required. Thus, an abrupt need for the addition of random access channel (RACH) resources may take place. Additionally, an effective and fast load-balancing procedure may be required.

It should be appreciated that embodiments described herein may be applied, in addition to the ASA, to load balancing in general, such as on-the-fly cell switching-off for energy-saving or performance optimization, site-failure recovery, etc. Embodiments are also suitable for intra/inter radio access technology (RAT) handovers.

FIG. 1 illustrates a simplified view of a communication environment only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for communication are irrelevant to the actual invention. Therefore, they need not to be discussed in more detail here.

In the example of FIG. 1, a radio system based on long term evolution advanced (LTE Advanced, LTE-A) network elements is shown. However, the embodiments described in these examples are not limited to the LTE-A radio systems but can also be implemented in other radio systems.

FIG. 1 shows eNodeBs 100 and 102 connected to core network ON 106 of a communication system. The eNodeBs are connected to each other over an X2 interface.

The eNodeBs 100, 102 that may also be called base stations of the radio system may host the functions for Radio Resource Management: Radio Bearer Control, Radio Admission Control, Connection Mobility Control, Dynamic Resource Allocation (scheduling). Depending on the system, the counterpart on the CN side can be a serving gateway (S-GW, routing and forwarding user data packets), packet data network gateway (P-GW, for providing connectivity of user devices (UEs) to external packet data networks), and/or mobile management entity (MME), etc. The MME (not shown) is responsible for the overall user terminal control in mobility, session/call and state management with assistance of the eNodeBs through which the user terminals connect to the network.

The communication system is also able to communicate with other networks, such as a public switched telephone network or the Internet 108. The communication network may also be able to support the usage of cloud services. It should be appreciated that eNodeBs or their functionalities may be implemented by using any node, host, server or access point etc. entity suitable for such a usage.

The user equipment UE (also called user device, user terminal, terminal device, etc.) illustrate one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user equipment typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device.

The user equipment (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Further, although the apparatuses have been depicted as single entities, different units, processors and/or memory units (not all shown in FIG. 1) may be implemented.

In an embodiment, the communication system further comprises or is connected to an ASA controller 110 configured to control ASA based operations within the system. In the example situation of FIG. 1, there is licensed spectrum available in the area. The licensed spectrum may be in incumbent use 112. The ASA controller 110 receives from administration or regulation networks information where and when ASA spectrum is available. The information may be dynamic, i.e. it may change with time.

In the example of FIG. 1, UE 114 is connected to the eNodeB 102 using spectrum allocated to the communication system. UEs 116, 118, 120 are connected to eNodeB 100 using ASA spectrum allocated to the eNodeB by the ASA controller.

It is obvious for a person skilled in the art that the depicted system is only an example of a part of a radio access system and in practise, the system may comprise a plurality of eNodeBs, the user device may have an access to a plurality of radio cells and the system may comprise also other apparatuses, such as physical layer relay nodes or other network elements, etc. At least one of the NodeBs or eNodeBs may be a Home eNodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The eNodeBs of FIG. 1 may provide any kind of these cells. A cellular radio system may be implemented as a multilayer network including several kinds of cells. Typically, in multilayer networks, one node provides one kind of a cell or cells, and thus a plurality of eNodeBs are required to provide such a network structure.

Recently for fulfilling the need for improving the deployment and performance of communication systems, the concept of "plug-and-play" eNodeBs has been introduced. Typically, a network which is able to use "plug-and-play" eNode Bs, includes, in addition to Home eNodeBs (HeNBs) or Home NodeBs (HNBs), a HeNB Gateway (HeNB GW), or HNB Gateway (HNB-GW) (not shown in FIG. 1). A HeNB GW or HNB-GW, which is typically installed within an operator's network, may aggregate traffic from a large number of HNBs back to a core network.

Figure 2:
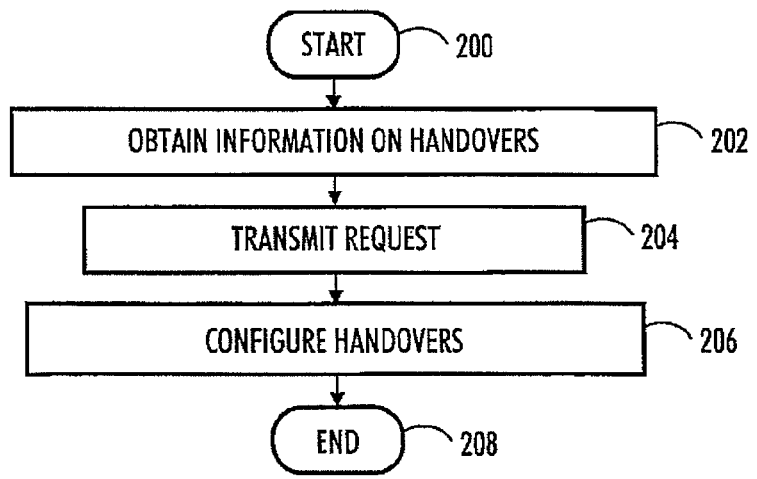
FIGS. 2 and 3 are flowcharts illustrating embodiments of the invention.

FIG. 2 is a flowchart illustrating an embodiment of the invention. The embodiment starts at step 200. The example of FIG. 2 illustrates the operation of eNodeB 100.

In step 202, the eNodeB obtains information of handovers to be performed regarding more than one user equipment connected to the apparatus. The information may come from the ASA controller 110, MME or OAM server of the network. The handovers may also be triggered from within the eNodeB based on some pre-configuration or some on-the-fly real-time measurement. An examples of a pre-configuration is some predefined time interval the cell should be evacuated, In step 204, the eNodeB is configured to request the user equipment to form one or more device-to-device clusters.

In step 206, the eNodeB configures and control handovers to be performed utilising information on the formed device-to-device clusters.

The process ends in step 208.

In an embodiment, an eNodeB, when receiving information of a cell evacuation or massive handover, configures the active UEs of the ASA cell to form device-to-device clusters before the actual handover to a neighbouring target cells is requested. Thus, the massive handover can be optimized on device-to-device cluster basis.

When obtaining information on cell evacuation, the eNodeB may be configured to determine whether a device-to-device cluster based handover process or traditional handover process is suitable.

In an embodiment, to assist the massive handover in cell evacuation scenario, three different device-to-device cluster modes may be configured:
  Uni-direction D2D cluster mode (UDCM), where only multicast from D2D cluster header (CH) to cluster member supported;
  Bi-direction D2D cluster mode (BDCM) where direct communication within D2D cluster supported; and
  Bi-direction D2D cluster mode with relaying capability (BDCR): D2D cluster also provides mobile relaying service.

The device-to-device clusters may be configured to operate in any mode of UDCM, BDCM or BDCR, and on either the ASA band, the licensed band of the neighbouring cells or even unlicensed ISM band depending on the network policies and the coordination among the ASA cell and neighbouring cells with device-to-device support capabilities, preferences and available resources. Forming the device-to-device cluster beforehand makes it possible to utilize the device-to-device cluster to optimize massive handover related operations, controls and signalings as earlier as possible, e.g. at the beginning from configuration on the inter-frequency related measurement.

Figure 3:
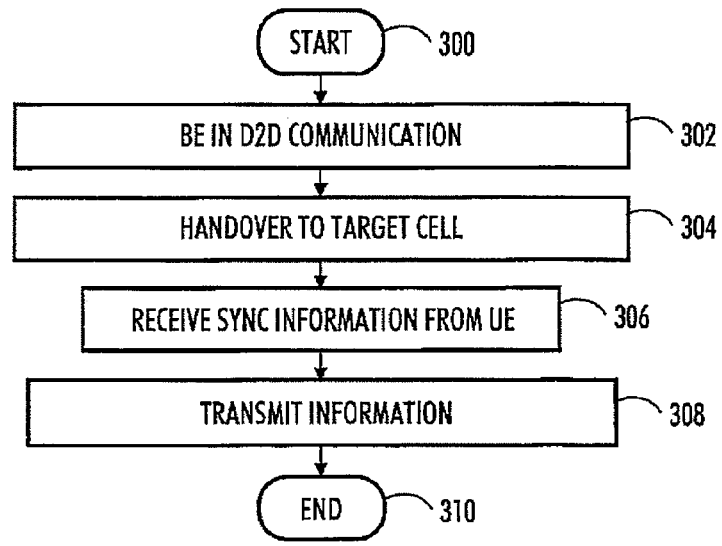

FIG. 3 is a flowchart illustrating an embodiment of the invention. The embodiment starts at step 300. The example of FIG. 3 illustrates the operation of user equipment acting as a cluster head.

In step 302, the user equipment is in device-to-device communication with a set of user equipment forming a device-to-device cluster.

In step 304, the user equipment is handed over to a target cell successfully while other user equipment of the cluster are still under the handover process.

In step 306, the user equipment receives from user equipment of the cluster downlink synchronization information.

In step 308, the user equipment is configured to transmit the information to the base station of the target cell.

The process ends in step 310.

Figure 4:
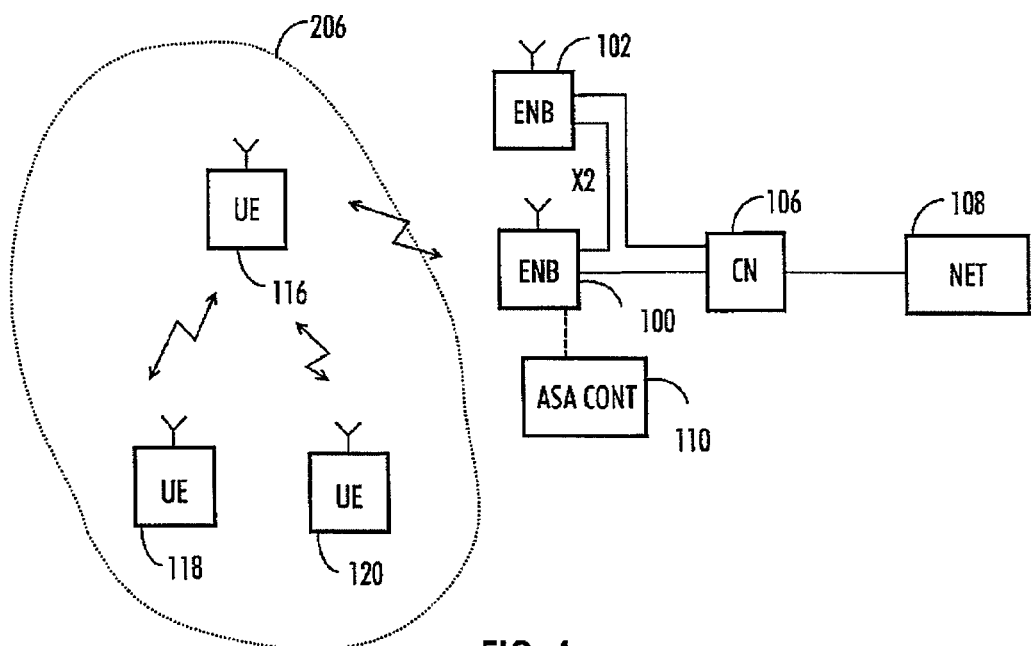
FIG. 4 illustrates an example of a communication environment.
Figure 5:
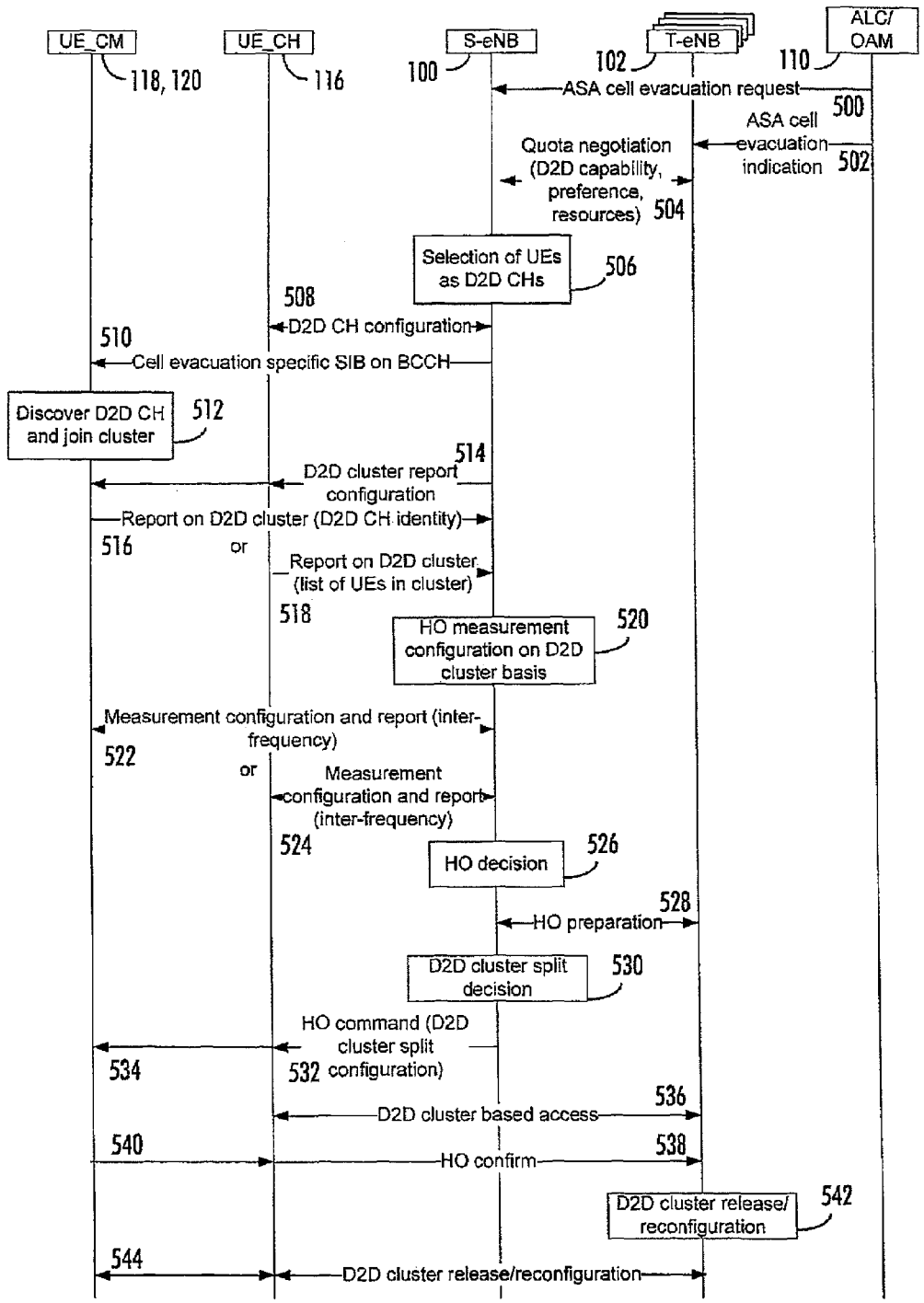
FIG. 5 is an example of a signaling chart illustrating an embodiment.

Let us study an example referring to FIGS. 4 and 5. FIG. 4 illustrates an example of a system where an ASA cell is to be evacuated and FIG. 5 is a signaling chart. The system of FIG. 4 is similar to the system of FIG. 1, but now the ASA controller 110 is issuing a cell evacuation request 500 to the eNodeB 100 which acts in this example as a source cell base station. An indication 502 of the cell evacuation is also sent to neighbouring cells which are potential target cells.

In an embodiment, information related to device-to-device support capabilities, preferences and available resources are exchanged 504 between neighbouring cells 100, 102 for cell evacuation purposes.

The source eNodeB 100 is configured to select 506 user equipment to act as a cluster head (CH) for each device-to-device cluster to be formed. When selecting the UEs to act as cluster heads, in addition to some attributes such as UE capabilities, battery status, channel conditions, traffic types etc., information on the timing advance of user equipment may be utilised. For example, the source eNodeB may select at least one UE for certain range of timing advance by determining that a group of user equipment has timing advance values in a same range close to each other and selecting user equipment having a value in the middle of the range as a cluster head of a device-to-device cluster. For larger timing advance values, multiple UEs may be selected as CHs.

The source eNodeB 100 is configured to communicate 508 with the UEs 116 selected as cluster heads for D2D CH configuration and also activation of D2D CH operation.

In an embodiment, cell evacuation specific system information 510 is transmitted by the source eNodeB 100 upon the need of ASA cell evacuation. In an embodiment, the system information is broadcasted only when an ASA cell is to be evacuated. Therefore, it can be seen by the UEs in the ASA cell as the trigger to discover 512 device-to-device cluster head and join a device-to-device cluster. The system information may be one bit indication on the activation of forming device-to-device cluster. The system information may alternatively include the cell evacuation related information and as well as the device-to-device cluster forming related information such as D2D CHs beacon signal or advertising channel information in frequency/time/code/space domain, the supported D2D cluster operation mode (either cell specific or each D2D CH specific), the timing (in form of System Frame Number SFN, for example) to stop D2D CH detection and joining and etc. The stop timing may be implicitly indicated by stopping the broadcast of the system information.

The source eNodeB 100 may command 514 the user equipment 116, 118, 120 to report the form of formed device-to-device clusters to the eNodeB. The UEs may report 516 cluster information individually 516 (in the form of the D2D CH identity, for example) or the cluster head 116 may report 518 a list of UEs in the cluster if D2D cluster is operated in BDCM or BDCR mode in which case-individual UEs do not send information to the eNodeB.

In an embodiment, the source eNodeB 100 may also configure 520 selected UE(s) in each D2D cluster for the inter-frequency measurement and request 522 report so that only limited number of the UEs may make the inter-frequency measurement and report it to the network for HO decision and most of the UEs can skip it. The UEs may report measurement reports individually 522 or the report may be set by the device-to-device cluster head 524.

The source eNodeB 100 may make decision 526 regarding the handovers of the UEs involved in the cell evacuation taking the inter-frequency measurements into account. The source eNodeB 100 and target eNodeB 102 may communicate 528 at this phase regarding handover preparation. The communication may be related to the context of the D2D clusters (including UE context of each user equipment belonging to the D2D cluster) to be handed over and the confirmation on available capacity of the target eNodeB, for example.

In an embodiment, device-to-device cluster based HO preparation procedures between the source eNodeB 100 and neighbouring target eNodeBs 102 may result in the split 530 of the device-to-device clusters if one target cell cannot accept the whole device-to-device cluster to be handed over. Based on the capacity/capability/resource commitment from each target cell, the source eNodeB and device-to-device cluster head may coordinate 532, 534 to split the D2D cluster into two or multiple clusters so that each cluster is configured to handover to different target cell.

When the handover of the UEs in the cluster is about to be performed, the device-to-device cluster head 116 may access 536 the target cell via RACH procedure and obtain the uplink (UL) timing advance information. Then the device-to-device cluster head may inform the cluster member UEs 118, 120 the timing advance information of its own and also collect the downlink (DL) synchronization status of all the member UEs. After that, the device-to-device cluster head may need to confirm 538 the HO complete to the network with the synchronization information of the member UEs (which may include also the information of the member UEs who have not yet synchronized with target cell and those UEs need to use RACH to get access to the target cell). After that the target eNodeB can schedule right away all the UEs (who have synchronized with target cell) for UUDL transmission.

In an embodiment, while the cluster head is performing RACH procedure to get uplink synchronization and timing advance information for uplink access in the target cell, the cluster members may perform and get downlink synchronization to the target cell (and eventually all needed system information sent on broadcast channel in downlink). Thus, when the cluster head is distributing the timing advance information to the cluster members and get acknowledgement from the individual members that they receive that correctly, the cluster head may report about the synchronization status (for both uplink and downlink) of the cluster members to the target cell.

In an embodiment, the individual members 118, 120 of the cluster may indicate/report 540 about downlink synchronization status to the cluster head 116 and the cluster head reports 538 that to the target eNodeB. The UEs may send the downlink synchronization information in the same message as an acknowledgement for timing information reception.

In an embodiment, the target eNodeB may configure a device-to-device cluster to release or reconfigure device-to-device cluster's operation after the device-to-device cluster has been handed over. If a device-to-device cluster works in UDCM mode or an BDCM mode cluster is only used for mediate HO related signaling, the target eNodeB may configure 542, 544 the device-to-device cluster to release after every cluster member has confirmed the successful HO and/or after some pre-defined time period. For example, the cluster members may be configured to autonomously leave the cluster after either the first successful uplink transmission to the target cell; or even as soon as it received the timing advance information from the CH; or when some preconfigured "target cell synchronization timer" expires. Whereas if a device-to-device cluster works in BDCR mode or an BDCM mode the cluster can be extended for cooperative control in the target cell. The device-to-device cluster may be reconfigured to reflect the situation of the target cell. For instance, if a device-to-device cluster is operated on the ASA band when it was formed in the source cell, the device-to-device cluster may be reconfigured to operate on the other band (e.g. licensed band of neighbouring cells or unlicensed ISM band) in order to release the ASA band for the primary user.

In an embodiment, the source eNodeB may configure a device-to-device cluster with some "cluster life-time" and "valid radio resources" to be used for D2D communications within the cluster during the configured "cluster life-time," especially when the cluster is only used to assist and optimize the massive HO execution. The "cluster life-time" can be set or derived based on maximum massive HO delay or timer. The device-to-device cluster may be configured to automatically release after the "cluster life-time" runs out. The radio resources may be the resources of the source eNodeB, or the target eNodeB of the handover operation or another carrier resources.

As example of FIG. 5 illustrates most of the HO related operations, controls and signalings either over air interface between UE and network or over interfaces between network entities (e.g. over X2 interface of source and target eNodeBs in LTE) can be optimized on device-to-device cluster basis. It is also possible to distribute the different operations among the UEs of a device-to-device cluster for example such as that one UE is responsible for measurement, another UE is responsible for signaling communication towards the network and one UE is responsible for collection/distribution of the signaling within the cluster.

Figure 6:
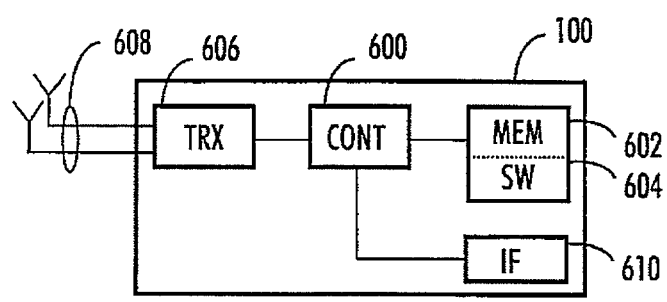
FIG. 6 illustrates an example of an apparatus applying embodiments of the invention.

FIG. 6 illustrates an embodiment. The figure illustrates a simplified example of an apparatus in which embodiments of the invention may be applied. In some embodiments, the device may be a base station or eNodeB or a part of an eNodeB communicating with a set of UEs.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus of the example includes a control circuitry 600 configured to control at least part of the operation of the apparatus.

The apparatus may comprise a memory 602 for storing data. Furthermore the memory may store software 604 executable by the control circuitry 600. The memory may be integrated in the control circuitry.

The apparatus comprises a transceiver 606. The transceiver is operationally connected to the control circuitry 600. It may be connected to an antenna arrangement 608 comprising one more antenna elements or antennas.

The software 604 may comprise a computer program comprising program code means adapted to cause the control circuitry 600 of the apparatus to control a transceiver 606.

The apparatus may further comprise an interface 610 operationally connected to the control circuitry 600. The interface may connect the apparatus to other respective apparatuses such as eNodeB via X2 interface or to the core network.

The control circuitry 600 is configured to execute one or more applications. The applications may be stored in the memory 602. The applications may cause the apparatus to obtain information of handovers to be performed regarding more than one user equipment connected to the apparatus; request the user equipment to form one or more device-to-device clusters and control handovers to be performed utilising information on the formed device-to-device clusters, for example.

Figure 7:
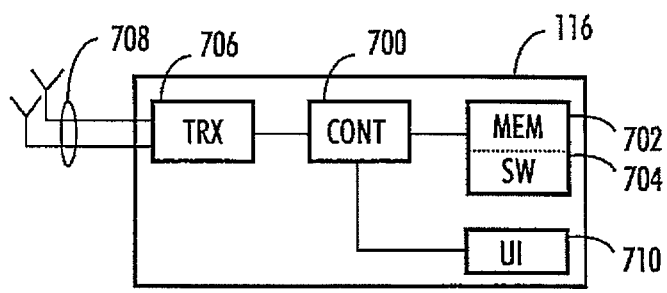
FIG. 7 illustrates another example of an apparatus applying embodiments of the invention.

FIG. 7 illustrates an embodiment. The figure illustrates a simplified example of an apparatus in which embodiments of the invention may be applied. In some embodiments, the apparatus may be user equipment or a part of user equipment communicating with an eNodeB and capable of joining a device-to-device cluster.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus of the example includes a control circuitry 700 configured to control at least part of the operation of the apparatus.

The apparatus may comprise a memory 702 for storing data. Furthermore the memory may store software 704 executable by the control circuitry 600. The memory may be integrated in the control circuitry.

The apparatus comprises a transceiver 706. The transceiver is operationally connected to the control circuitry 700. It may be connected to an antenna arrangement 708 comprising one more antenna elements or antennas.

The software 704 may comprise a computer program comprising program code means adapted to cause the control circuitry 700 of the apparatus to control a transceiver 706.

The apparatus may further comprise user interface 710 operationally connected to the control circuitry 700. The interface may comprise a (touch sensitive) display, a keypad, a microphone, and a speaker, for example.

The control circuitry 700 is configured to execute one or more applications. The applications may be stored in the memory 702. The applications may cause the apparatus to be in device-to-device communication with a set of user equipment forming a device-to-device cluster to be handed over to a target cell of a communication system; be handed over to the target cell while other user equipment of the cluster are still under the handover process; receive from user equipment of the cluster downlink synchronization information and transmit the information to the base station of the target cell, for example.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, or a circuitry which may comprise a working memory (RAM), a central processing unit (CPU), and a system clock. The CPU may comprise a set of registers, an arithmetic logic unit, and a controller. The controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as technology advances, the inventive concept can be implemented in various ways. The invention and its embodiments are not limited to the examples described above but may vary within the scope of the claim.

The invention claimed is:

1. An apparatus, comprising:
  at least one processor; and
  at least one memory including computer program code, the at least one memory and the computer program code configured to, with the at least one processor, cause the apparatus at least to:
    be in device-to-device communication with a set of user equipment forming a device-to-device cluster to be handed over in a cell evacuation or massive handover to a target cell of a communication system;
    transmit to a user equipment acting as a cluster head downlink synchronization status information; and
    leave the device-to-device cluster autonomously after a predefined timer has expired and after a successful reception of timing advance information for the target cell from the user equipment acting as the device-to-device cluster head.

2. The apparatus of claim 1, wherein the downlink synchronization status information is transmitted in a same message as an acknowledgement for the timing advance information.

3. The apparatus of claim 1, further configured to leave the device-to-device cluster autonomously after a successful handover to the target cell.

4. The apparatus of claim 1, wherein the predefined timer is a synchronization timer for the target cell.

5. The apparatus of claim 1, further configured to:
  perform inter-frequency measurement in response to receipt of a command to perform the inter-frequency measurements; and
  report the inter-frequency measurements to the user equipment acting as the device-to-device cluster head.

6. The apparatus of claim 1, wherein a user equipment of the device-to-device cluster set comprises the apparatus.

7. A method, comprising:
  being in device-to-device communication with a set of user equipment forming a device-to-device cluster to be handed over in a cell evacuation or massive handover to a target cell of a communication system;
  transmitting to a user equipment acting as a cluster head downlink synchronization status information; and
  leaving the device-to-device cluster autonomously after a predefined timer has expired and after a successful reception of timing advance information for the target cell from the user equipment acting as the device-to-device cluster head.

8. The method of claim 7, wherein the downlink synchronization status information is transmitted in a same message as an acknowledgement for the timing advance information.

9. The method of claim 7, further comprising: leaving the device-to-device cluster autonomously after a successful handover to the target cell.

10. The method of claim 7, wherein the predefined timer is a synchronization timer for the target cell.

11. The method of claim 7, further comprising:
  performing inter-frequency measurement in response to receipt of a command to perform the inter-frequency measurements; and
  reporting the inter-frequency measurements to the user equipment acting as the device-to-device cluster head.

12. A computer program product embodied on a non-transitory computer readable medium comprising program instructions which, when executed by a processor, causes an apparatus to:
  be in device-to-device communication with a set of user equipment forming a device-to-device cluster to be handed over to a target cell of a communication system;
  be handed over to the target cell;
  transmit to user equipment acting as cluster head downlink synchronization information; and
  leave the cluster autonomously after a predefined timer has expired and after a successful reception of timing advance information for the target cell from the user equipment acting as the device-to-device cluster head.

13. The computer program product of claim 12, wherein the downlink synchronization status information is transmitted in a same message as an acknowledgement for the timing advance information.

14. The computer program product of claim 12, wherein the apparatus is further caused to leave the device-to-device cluster autonomously after a successful handover to the target cell.

15. The computer program product of claim 12, wherein the predefined timer is a synchronization timer for the target cell.

16. The computer program product of claim 12, wherein the apparatus is further caused to:
    perform inter-frequency measurement in response to receipt of a command to perform the inter-frequency measurements; and
    report the inter-frequency measurements to the user equipment acting as the device-to-device cluster head.

17. The computer program product of claim 12, wherein a user equipment of the device-to-device cluster set comprises the apparatus.

\* \* \* \* \*